United States Patent
Rajaram et al.

(10) Patent No.: US 7,287,370 B2
(45) Date of Patent: Oct. 30, 2007

(54) NOX-TRAP

(75) Inventors: Raj Rao Rajaram, Slough (GB); Stephen Poulston, Reading (GB)

(73) Assignee: Johnson Matthey Public Limited Company, London (GB)

( * ) Notice: Subject to any disclaimer, the term of this patent is extended or adjusted under 35 U.S.C. 154(b) by 624 days.

(21) Appl. No.: 10/380,597

(22) PCT Filed: Sep. 17, 2001

(86) PCT No.: PCT/GB01/04160

§ 371 (c)(1),
(2), (4) Date: Aug. 18, 2003

(87) PCT Pub. No.: WO02/22241

PCT Pub. Date: Mar. 21, 2002

(65) Prior Publication Data

US 2004/0042939 A1   Mar. 4, 2004

(30) Foreign Application Priority Data

Sep. 16, 2000 (GB) ................................. 0022786.8

(51) Int. Cl.
| | |
|---|---|
| *B01J 23/02* | (2006.01) |
| *B01J 23/04* | (2006.01) |
| *B01J 23/10* | (2006.01) |
| *B01J 23/26* | (2006.01) |
| *B01J 23/34* | (2006.01) |
| *B01J 23/42* | (2006.01) |
| *C01B 21/20* | (2006.01) |
| *C01B 21/36* | (2006.01) |
| *F01N 3/10* | (2006.01) |

(52) U.S. Cl. ............... 60/274; 60/299; 60/301; 422/170; 422/171; 422/177; 423/213.5; 423/239.1; 423/245.1; 428/457; 428/472; 428/688; 428/689; 502/302; 502/303; 502/304; 502/306; 502/324; 502/326; 502/327; 502/527.19

(58) Field of Classification Search ............. 423/213.5, 423/239.1, 245.1; 60/274, 299, 301; 422/170, 422/171, 177; 428/457, 472, 688, 689; 502/302, 502/303, 304, 306, 324, 326, 327, 527.19
See application file for complete search history.

(56) References Cited

U.S. PATENT DOCUMENTS 4,071,600 A   1/1978   Schlatter et al.

(Continued)

FOREIGN PATENT DOCUMENTS

AU   199944667 A1   3/2000

(Continued)

OTHER PUBLICATIONS

Copy of Office Action dated Jun. 14, 2006 from U.S. Appl. No. 10/432,099.

(Continued)

*Primary Examiner*—Wayne A. Langel
(74) *Attorney, Agent, or Firm*—RatnerPrestia

(57) ABSTRACT

A NOx-trap composition comprises: (a) at least one first NOx storage component comprising at least one alkali metal supported on at least one first support material; and (b) a platinum oxidation catalyst and at least one second NOx storage component not being an alkali metal supported on at least one second support material, whereby the platinum oxidation catalyst and the at least one alkali metal are physically segregated thereby susbtantially maintaining the hydrocarbon conversion activity of the platinum oxidation catalyst.

29 Claims, 1 Drawing Sheet

U.S. PATENT DOCUMENTS

Figure 1:
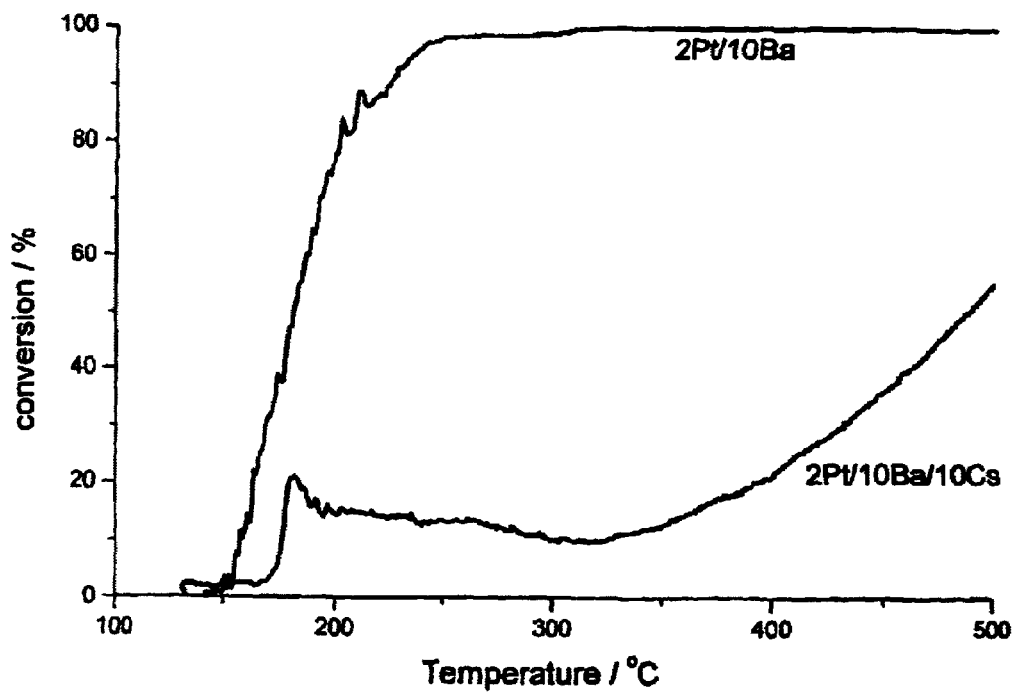

| | | | |
|---|---|---|---|
| 4,675,308 A | 6/1987 | Wan et al. |
| 5,075,274 A | 12/1991 | Kiyohide et al. |
| 5,158,582 A | 10/1992 | Onitsuka et al. |
| 5,451,558 A | 9/1995 | Campbell et al. |
| 5,473,887 A | 12/1995 | Takeshima et al. |
| 5,727,385 A | 3/1998 | Hepburn |
| 5,750,082 A | 5/1998 | Hepburn et al. |
| 5,814,576 A | 9/1998 | Yamamoto |
| 5,837,212 A | 11/1998 | Hepburn et al. |
| 5,849,661 A | 12/1998 | Yamashita et al. |
| 5,948,376 A | 9/1999 | Miyoshi et al. |
| 6,083,868 A | 7/2000 | Yoshida et al. |
| 6,182,443 B1 | 2/2001 | Jarvis et al. |
| 6,350,421 B1 | 2/2002 | Strehlau et al. |
| 6,375,910 B1 | 4/2002 | Deeba et al. |
| 6,413,483 B1 | 7/2002 | Brisley et al. |
| 6,413,904 B1 | 7/2002 | Strehlau et al. |
| 6,419,890 B1 | 7/2002 | Li |
| 6,461,579 B1 * | 10/2002 | Hachisuka et al. ...... 423/213.5 |
| 6,680,036 B1 | 1/2004 | Fisher et al. |
| 6,897,182 B2 | 5/2005 | Cutler et al. |
| 2002/0103078 A1 | 8/2002 | Hu et al. |
| 2002/0182134 A1 | 12/2002 | Wu et al. |

FOREIGN PATENT DOCUMENTS

| | | | |
|---|---|---|---|
| AU | 199953609 A1 | 4/2000 |
| EP | 0 666 102 A1 | 8/1995 |
| EP | 0 669 157 A1 | 8/1995 |
| EP | 0 764 459 | 3/1997 |
| EP | 0 771 584 A1 | 5/1997 |
| EP | 0 778 072 A2 | 6/1997 |
| EP | 0 838 255 A2 | 4/1998 |
| EP | 0 845 289 A1 | 6/1998 |
| EP | 0 852 966 A1 | 7/1998 |
| EP | 0 857 510 A1 | 8/1998 |
| EP | 0 982 066 A1 | 3/2000 |
| EP | 0 993 860 A1 | 4/2000 |
| EP | 1 033 161 A1 | 9/2000 |
| JP | 04-367707 | 12/1992 |
| JP | 63080850 | 4/1998 |
| JP | 10-286461 | 10/1998 |
| JP | 99/29417 * | 6/1999 |
| WO | WO97/43031 | 11/1997 |
| WO | WO98/03251 | 1/1998 |
| WO | WO-99/26715 A1 | 6/1999 |
| WO | WO-00/59611 | 10/2000 |
| WO | WO-00/64580 A1 | 11/2000 |
| WO | WO-00/67883 A1 | 11/2000 |

OTHER PUBLICATIONS

Office Action dated Nov. 2, 2005, from U.S. Appl. No. 10/432,099.

Copy of the International Search Report, from International Application No. PCT/GB01/04160, dated Dec. 7, 2001.

British Search Report, from U.K. Application No. 0022786.8, dated Feb. 27, 2001.

* cited by examiner

NOX-TRAP

This application is the U.S. National Phase application of PCT International Application No. PCT/GB01/04160.

The present invention relates to a NOx-trap composition.

Manufacturers are increasingly interested in engines which operate under lean-running conditions to power their vehicles. One reason for this is because lean-burn engines produce less $CO_2$. This is advantageous because future emission legislation aims to reduce $CO_2$, but the consumer also benefits from the increased fuel economy. Using engine management techniques and/or employing one or more catalytic converter in a vehicle's exhaust system can control the gaseous composition of the exhaust so that the vehicle meets the relevant emission legislation.

One form of lean-burn engine is a gasoline direct injection engine, which is designed to operate under stoichiometric and lean conditions. When running lean, relatively low levels of NOx are formed that cannot be reduced (removed) in the presence of the relatively high levels of oxygen in the exhaust gas. Reducing species, e.g. unburnt hydrocarbons, can reduce NOx to $N_2$ during stoichiometric-or rich-running conditions, as comparatively less oxygen is present than during lean-running conditions. In order to control NOx in lean-burn engines, there has been devised a NOx absorber/catalyst which can store NOx, e.g. as nitrate, when an engine is running lean. In a stoichiometric or rich environment, the nitrate is understood to be thermodynamically unstable, and the stored NOx is released and is reduced by the reducing species present in the exhaust gas. This NOx absorber/catalyst is commonly called a NOx-trap. By periodically controlling the engine to run stoichiometrically or rich, stored NOx is reduced and the NOx-trap regenerated.

A typical NOx-trap formulation includes a catalytic oxidation component, such as platinum, a NOx-storage component, such as barium, and a reduction catalyst e.g. rhodium. One mechanism commonly given for NOx-storage during lean engine operation for this formulation is: (i) $NO + \frac{1}{2}O_2 \rightarrow NO_2$; and (ii) $BaO + NO_2 + \frac{1}{2}O_2 \rightarrow Ba(NO_3)_2$. In the first step, the nitric oxide reacts with oxygen on active oxidation sites on the platinum to form $NO_2$. The second step involves adsorption of the $NO_2$ by the storage material in the form of an inorganic nitrate.

When the engine runs under rich conditions or at elevated temperatures, the nitrate species become thermodynamically unstable and decompose, producing NO or $NO_2$ according to equation (iii) below. Under rich conditions, these nitrogen oxides are subsequently reduced by carbon monoxide, hydrogen and hydrocarbons to $N_2$, which can take place over the reduction catalyst. (iii) $Ba(NO_3)_2 \rightarrow BaO + 2NO + \frac{3}{2}O_2$ or $Ba(NO_3)_2 \rightarrow BaO + 2NO_2 + \frac{1}{2}O_2$; and (iv) $NO + CO \rightarrow \frac{1}{2}N_2 + CO_2$ (and other reactions). In the reactions of (i)-(iv) above the reactive barium species is given as the oxide. However, it is understood that in the presence of air most of the barium is in the form of the carbonate or possibly the hydroxide. The above reaction schemes can be adapted accordingly for species of barium other than the oxide.

NOx-trap compositions including potassium and manganese are known. It has also been suggested that potassium and strontium can poison the ability of platinum to oxidise nitrogen oxide to nitrogen dioxide in exhaust gases from a lean-running engine. In order to avoid this problem it has been suggested that alkali metals and alkaline-earth metals be carried on a first porous support and the platinum be carried on a second porous support.

Alkaline-earth metals, such as barium, can be considered as relatively low temperature NOx storage components. This is because the barium nitrate storage form is thermally unstable above about 350° C. in exhaust gases of about lambda=1. We consider alkali metals, e.g. potassium or caesium, to be relatively high temperature NOx storage components because the thermal stability of the nitrate storage forms of these components extends to about 550° C. in exhaust gases of about lambda=1.

An exhaust gas composition of about lambda=1 has no net oxidising or reducing potential because the concentration of oxidants and reductants present are substantially in balance. Such an exhaust gas can be produced in an engine, e.g. a gasoline engine, run at an air-to-fuel ratio of approximately 14.7:1, wherein the exhaust system includes no exhaust gas recirculation or post-combustion injection of air or hydrocarbon.

We have found that alkali metals can poison the ability of platinum-based catalysts to oxidise hydrocarbon (HC) in the exhaust gas, whereas for optimal low-temperature NOx storage efficiency, the alkaline-earth metal should be intimately associated with the platinum oxidation catalyst. We have now found a way of using both high- and low-temperature NOx storage components in a NOx-trap composition whilst substantially maintaining platinum HC conversion activity.

According to one aspect, the invention provides A NOx-trap composition comprising:
(a) at least one first NOx storage component comprising at least one alkali metal supported on at least one first support material; and
(b) a platinum oxidation catalyst and at least one second NOx storage component not being an alkali metal supported on at least one second support material,
whereby the platinum oxidation catalyst and the at least one alkali metal are segregated thereby substantially maintaining the hydrocarbon conversion activity of the platinum oxidation catalyst.

"Segregated" herein is defined as "prevented, as far as possible, from chemically interacting with." By "substantially maintaining" herein, we mean "retains at least 60% activity of the fresh catalyst" and in exemplary embodiments "retains at least 70% activity of the fresh catalyst", "retains at least 80% activity of the fresh catalyst" and "retains at least 90% activity of the fresh catalyst."

In an exemplary embodiment, the second support material consists of the at least one NOx storage component.

In an exemplary embodiment, the at least one first NOx storage component is associated with at least one base metal oxidation catalyst. The at least one base metal oxidation catalyst can comprise manganese, chromium, cobalt or iron, or mixtures of any two or more thereof. In an exemplary embodiment the at least one base metal oxidation catalyst is manganese.

Whilst the invention has application in general to lean-burn internal combustion engines, particularly gasoline engines such as gasoline direct injection engines, it can also be used in connection with other lean-burn engines including diesel engines.

Apart from the improved temperature window for maximal NOx storage efficiency over known compositions, we understand that for the equivalent level of low temperature NOx storage efficiency, the composition of the invention utilises less PGM than a known composition including platinum and barium. Furthermore, because HC oxidation activity of the PGM is not compromised, it is unnecessary to include further expensive catalysts in an exhaust system to treat HC in order to meet present and future mission legislation.

The segregation feature can be accomplished in a number of ways. In one exemplary embodiment, the at least one first support material is in a separate layer above the at least one second support material. In a further exemplary embodiment, the at least one first support material is in a separate layer below the at least one second support material. It is possible that during high-temperature aging, migration of alkali metal can occur, for example into the pores of a cordierite monolith. By disposing the at least one first support material and the at least one second support material in different layers from one another, there is less likelihood of undesirable interactions occurring.

In a further exemplary embodiment, the at least one first support material and the associated at least one base metal oxidation catalyst are in a separate layer above the at least one second support material. In a further exemplary embodiment, the at least one first support material and the associated at least one base metal oxidation catalyst are in a separate layer below the at least one second support material. A further explanation of how to segregate components in a catalytic converter composition can be found in our WO 98/03251.

In a further exemplary embodiment, the at least one second support material is arranged in an exhaust system so that it is upstream of the at least one first support. In a further exemplary embodiment, the at least one second support material is arranged in an exhaust system so that it is downstream of the at least one first support material. This can be accomplished by coating each part of the composition on separate substrates or as distinct zones on the same substrate (or "single brick"). In a further exemplary embodiment the at least one second support material is arranged in an exhaust system so that it is upstream of the at least one first support material and associated at least one base metal oxidation catalyst. In a further exemplary embodiment, the at least one second support material is arranged in an exhaust system so that it is downstream of the at least one first support material and associated at least one base metal oxidation catalyst.

In a further exemplary embodiment, the at least one base metal oxidation catalyst is supported on the at least one first support material. The close association of the NOx storage component and the oxidation catalyst provides a higher NOx-storage efficiency.

The NOx-storage components and the base metal oxidation catalysts of the present invention are usually present in the form of oxides, but it is known that in the presence of air these materials can also be present in the form of carbonates and hydroxides. Where there are mixtures of two or more NOx storage components or base metal oxidation catalysts present, each mixture can also be present as a mixed oxide.

In an exemplary embodiment, the at least one alkali metal is at least one of potassium and caesium.

The at least one second NOx storage component can include at least one alkaline-earth metal and at least one rare earth. The at least one alkaline-earth metal NOx storage component can be barium, calcium, strontium or magnesium or a mixture of any two or more thereof. In an exemplary embodiment, the at least one second NOx storage component is barium. The at least one rare earth can be lanthanum, yttrium, cerium praseodymium, neodymium, promethium, samarium, europium, gadolinium, terbium, dysprosium, holmium, erbium, thulium, ytterbium or lutetium or a mixture of any two or more thereof.

The NOx-trap composition according to the invention can further comprise a catalyst capable of reducing NOx in an exhaust gas. In an exemplary embodiment, the NOx reduction catalyst is rhodium.

In an exemplary embodiment, the NOx-trap composition comprises at least one first support material comprising caesium and at least one third support material comprising rhodium which at least one first support material and at least one third support material are in a layer over a layer including at least one second support material supporting platinum and barium.

In a further exemplary embodiment, the NOx-trap composition comprises at least one first support material comprising caesium and at least one third support material comprising rhodium which at least one first support material and at least one third support material are in a layer under a layer including at least one second support material supporting platinum and barium.

In a further exemplary embodiment, the NOx-trap composition comprises at least one first support material comprising caesium and manganese and at least one third support material comprising rhodium which at least one first support material and at least one third support material are in a layer over a layer including at least one second support material supporting platinum and barium.

In an exemplary embodiment, the NOx-trap composition comprises at least one first support material comprising caesium and manganese and at least one third support material comprising rhodium which at least one first support material and at least one third support material are in a layer under a layer including at least one second support material supporting platinum and barium.

In a further exemplary embodiment, the NOx-trap composition comprises at least one first support material comprising potassium and at least one third support material comprising rhodium which at least one first support material and at least one third support material are in a layer over a layer including at least one second support material supporting platinum and barium.

In a further exemplary embodiment, the NOx-trap composition comprises at least one first support material comprising potassium and at least one third support material comprising rhodium which at least one first support material and at least one third support material are in a layer under a layer including at least one second support material supporting platinum and barium.

In a further exemplary embodiment, the NOx-trap composition comprises at least one first support material comprising potassium and manganese and at least one third support material comprising rhodium which at least one first support material and at least one third support material are in a layer over a layer including at least one second support material supporting platinum and barium.

In a further exemplary embodiment, the NOx-trap composition comprises at least one first support material comprising potassium and manganese and at least one third support material comprising rhodium which at least one first support material and at least one third support material are in a layer under a layer including at least one second support material supporting platinum and barium.

The at least one first support material, the at least one second support material and the at least one third support material can be alumina, ceria, zirconia or titania or a mixed oxide of any two or more thereof or a mixture of any two or more of any of the preceding oxides, optionally stabilised or "doped" with lanthanum, yttrium, cerium praseodymium, neodymium, promethium, samarium, europium, gadolinium, terbium, dysprosium, holmium, erbium, thulium, ytterbium or lutetium. Of course, the at least one first support material and the at least one second support material and the at least one third support material can each be the same or different and when different can each be chosen from the list of above supports.

According to a further aspect, the invention provides a metal or ceramic substrate coated with a NOx-trap composition according to the invention. Where the substrate is a ceramic substrate, it is cordierite, mullite, alumina, silicon carbide, zirconia or sodium/zirconia/phosphate. In an exemplary embodiment, the ceramic substrate is cordierite.

The substrate can have any arrangement commonly used in the art, such as a honeycomb flow-through monolith. However, foam or bead forms of a substrate can be used in the alternative.

According to a further aspect, the invention provides an exhaust system for a lean-burn internal combustion engine including a NOx-trap composition according to the invention or a substrate coated with the composition according to the invention. By "lean-burn engine" herein, we mean an engine which is controlled so that during at least part of its normal operation it runs on a lean of stoichiometric air-to-fuel ratio, i.e. where $\lambda>1$. Lean-burn engines as defined herein include partial lean-burn gasoline engines using a variety of injectors including those with air assisted direct injection and high-pressure direct injection, diesel engines or engines which run on alternative fuels such as compressed natural gas or liquid petroleum gas.

In an exemplary embodiment, the exhaust system comprises a first substrate coated with the at least one first support material and a second substrate coated with the at least one second support material, the first substrate being positioned either upstream or downstream of the second substrate.

In a further exemplary embodiment, the exhaust system of the invention further comprises means for controlling the redox composition of the exhaust gas.

In an exemplary embodiment, the means for controlling the redox composition of the exhaust gas comprises at least one of: means for injecting the hydrocarbon into the exhaust gas; means for adjusting the ignition timing of at least one engine cylinder; and means for adjusting the engine air-to-fuel ratio.

In a further exemplary embodiment, the control means of the exhaust system comprises an electronic control unit (ECU). The ECU can comprise a pre-programmed microprocessor, for example.

In a further aspect the invention provides a vehicle including a lean-burn engine and an exhaust system according to the invention. In an exemplary embodiment, the engine is a lean-burn gasoline engine. In a further exemplary embodiment, the engine is a gasoline direct injection (GDI) engine.

According to another aspect, the invention provides the use of a composition according to the invention or of a substrate coated with a NOx-trap composition according to the invention to absorb NOx from exhaust gases of a lean-burn engine during lean-running conditions.

According to another aspect, the invention provides the use of a NOx-trap composition according to the invention or of a substrate according to the invention for oxidising hydrocarbon in a lean-burn engine exhaust gas during lean-running or stoichiometric-running conditions.

According to another aspect of the invention, there is provided a method of making a NOx-trap composition, which composition comprising at least one NOx storage component including at least one alkali metal and a at least one second support material comprising a platinum oxidation catalyst and at least one NOx storage component not being an alkali metal, which method includes segregating the alkali metal and the platinum oxidation catalyst.

Methods of making a NOx-trap composition for use in the exhaust systems are well known and will not be explained in detail here. The support materials of the NOx-trap composition can be obtained using solid/solid reaction of the oxides or any other precursor such as carbonates. They may also be prepared by a wet route, i.e. by precipitation with a base of the salts of the support material components, then calcining. NOx storage components to be supported on a support material can be impregnated onto the support material utilising the incipient wetness technique and calcining. A preferred means of preparing a co-supported potassium and manganese component is to impregnate a suitable support with potassium permanganate.

Figure 2:
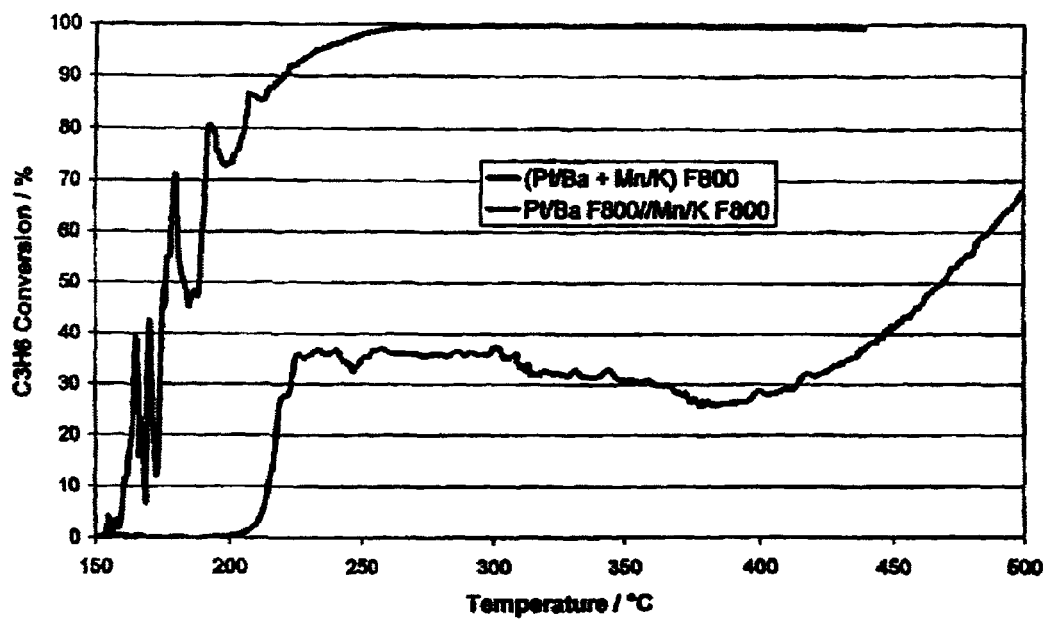

In order that the invention may be more fully understood, the following Examples are provided by way of illustration only and with reference to the accompanying drawings in which:

FIG. 1 shows a graph demonstrating the propene light-off activity as represented by the % conversion of propene in a synthetic gas mixture against temperature for two single layered NOx-trap compositions; and FIG. 2 shows a graph demonstrating the propene light-off activity as represented by the % conversion of propene in a synthetic gas mixture against temperature for a single and a double-layered catalyst.

EXAMPLE 1

The propene, i.e. hydrocarbon, light-off activity as represented by the % conversion of propene for two NOx-trap compositions including as active components a physical mixture of: 2 wt % platinum/10 wt % barium/10 wt % caesium; and 2 wt % platinum/2 wt % barium (both calcined in air at 500° C. for 2 hours) respectively was investigated on a synthetic gas unit over a range of temperatures. The active components were supported on a mixture of a mixed oxide of ceria-zirconia and alumina. The composition of the synthetic gas mixture before contacting the catalyst was 400 ppm propene, 500 ppm NO, 7.5% $O_2$, 0.5% CO, 15% $CO_2$, 4.5% $H_2O$. A mass spectrometer was used to determine and quantify the composition of the gas exiting the catalyst. The % conversion of propene recorded at each temperature for each composition is shown in FIG. 1.

It can be seen from FIG. 1 that the propene light-off activity of the composition including caesium is markedly lower than the composition without caesium. This illustrates the poisoning of platinum's HC oxidation activity if it is closely associated with high temperature NOx storage components such as caesium.

It will also be seen that there is the barium does not poison the HC oxidation activity of the platinum.

EXAMPLE 2

The experimental procedure of Example 1 was repeated with two further NOx-trap compositions. The first is a physical mixture of 2 wt % platinum/10 wt % barium on one support material and 10 wt % potassium/10 wt % manganese on a second support material; and the second comprises the same components but the platinum/barium component is in a separate layer below the manganese/potassium component In the layered catalyst, each component was prepared separately by calcining in air at 500° C. for 2 hours, then calcined in air at 800° C. for a further 2 hours. In the single layer embodiment, the physical mixture was calcined at 500° C. and then 800° C. for the period indicated. The % conversion of propene recorded at each temperature for each composition is shown in FIG. 2.

As can be seen, even when the at least one alkali metal component and the platinum oxidation catalyst component are supported on separate support materials, following high temperature aging, the HC conversion activity of the platinum is compromised to sub-optimal performance. However, by physically segregating these components, the HC conversion activity of the platinum oxidation catalyst is substantially maintained.

The invention claimed is:

1. A NOx-trap composition comprising:
   (a) at least one first NOx storage component comprising at least one alkali metal supported on at least one first support material; and
   (b) a platinum oxidation catalyst and at least one second NOx storage component comprising an alkaline-earth metal or a rare earth or a mixture of any two or more thereof supported on at least one second support material,
wherein the platinum oxidation catalyst and the at least one alkali metal are physically segregated thereby substantially maintaining the hydrocarbon conversion activity of the platinum oxidation catalyst and wherein said at least one first NOx storage component is associated with at least one base metal oxidation catalyst comprising manganese, chromium, cobalt, or iron, or mixtures of any two or more thereof supported on the first support material.

2. A NOx-trap composition according to claim 1, wherein the at least one second support material consists of the at least one second NOx storage component.

3. A NOx-trap composition according to claim 1, wherein the at least one alkali metal is at least one member selected from the group consisting of potassium and caesium.

4. A NOx-trap composition according to claim 1, wherein the at least one alkaline-earth metal NOx storage component is selected from the group consisting of barium, calcium, strontium, magnesium and mixtures of any two or more thereof.

5. A NOx-trap composition according to claim 1, wherein the at least one rare earth NOx storage component is selected from the group consisting of lanthanum, yttrium, cerium, praseodymium, neodymium, promethium, samarium, europium, gadolinium, terbium, dysprosium, holmium, erbium, thulium, ytterbium, lutetium and mixtures of any two or more thereof.

6. A NOx-trap composition according to claim 1, further comprising a catalyst capable of reducing NOx.

7. A NOx-trap composition according to claim 6, wherein the NOx reduction catalyst comprises rhodium.

8. A NOx-trap composition according to claim 1 further comprising at least one third support material, wherein the at least one first and the at least one second support and the at least one third support material comprises alumina, ceria, zirconia or titania or a mixed oxide of any two or more thereof, or a mixture of any two or more of any of the preceding oxides.

9. A NOx-trap composition according to claim 8, wherein the oxide supports are stabilised with at least one element selected from the group consisting of lanthanum, yttrium, cerium, praseodymium, neodymium, promethium, samarium, europium, gadolinium, terbium, dysprosium, holmium, erbium, thulium, ytterbium or lutetium and mixtures of any two or more thereof.

10. A metal or ceramic substrate coated with a NOx-trap composition according to claim 1.

11. A substrate according to claim 10, wherein the ceramic substrate comprises cordierite, mullite, alumina, silicon carbide, zirconia or sodium/zirconia/phosphate.

12. A substrate according to claim 10 which is a honeycomb flow-through monolith.

13. A substrate according to claim 10, comprising first and second zones the first zone comprising the at least one first NOx storage component and the second zone comprising the platinum oxidation catalyst.

14. A shell or can including a substrate according to claim 10.

15. A shell or can comprising first and second substrates, the first substrate comprising at least one first NOx storage component comprising at least one alkali metal supported on at least one first support material and the second substrate comprising a platinum oxidation catalyst and at least one second NOx storage component comprising an alkaline-earth metal or a rare earth or a mixture of any two or more thereof supported on at least one second support material, wherein the platinum oxidation catalyst and the at least one alkali metal are physically segregated thereby substantially maintaining the hydrocarbon conversion activity of the platinum oxidation catalyst and wherein said at least one first NOx storage component is associated with at least one base metal oxidation catalyst comprising manganese, chromium, cobalt, or iron, or mixtures of any two or more thereof supported on the first support material.

16. An exhaust system for a lean-burn engine including a NOx-trap composition according to claim 1.

17. An exhaust system according to claim 16, comprising a first substrate coated with the at least one first support material and a second substrate coated with the at least one second support material, the first substrate being positioned either upstream or downstream from the second substrate.

18. An exhaust system according to claim 16, further comprising means for controlling the redox composition of the exhaust gas.

19. An exhaust system according to claim 18, wherein the means for controlling the redox composition of the exhaust gas comprises at least one member selected from the group consisting of: means for injecting the hydrocarbon into the exhaust gas; means for adjusting the ignition timing of at least one engine cylinder; and means for adjusting the engine air-to-fuel ratio.

20. An exhaust system according to claim 18, wherein the control means comprises an electronic control unit.

21. A vehicle comprising a lean-burn engine and an exhaust system according to claim 16.

22. A vehicle according to claim 21, wherein the engine is a gasoline engine.

23. A vehicle according to claim 22, wherein the engine is a gasoline direct injection engine.

24. A method of making a NOx-trap composition, which composition comprises at least one NOx storage component including at least one alkali metal associated with at least one base metal oxidation catalyst comprising manganese, chromium, cobalt, or iron, or mixtures of any two or more thereof supported on a first support material and a platinum oxidation catalyst associated with at least one NOx storage component including an alkaline-earth metal or a rare earth or a mixture of any two or more thereof, which method includes segregating the alkali metal from the platinum oxidation catalyst.

25. A method for absorbing NOx from a lean-burn engine exhaust gas comprising the step of contacting the exhaust gas with a NOx-trap composition according to claim 1 during lean-running or stoichiometric-running conditions.

26. A method for oxidising hydrocarbon in a lean-burn engine exhaust gas comprising the step of contacting the exhaust gas with a NOx-trap composition according to claim 1 during lean-running conditions.

27. An exhaust system for a lean burn engine including a substrate according to claim 10.

28. A method for absorbing NOx from a lean-burn engine exhaust gas comprising the step of contacting the exhaust gas with a substrate according to claim 10 during lean-running or stoichiometric running conditions.

29. A method for oxidising hydrocarbon in a lean-burn engine exhaust gas comprising the step of contacting the exhaust gas with a substrate according to claim 10 during lean running conditions.

* * * * *